US012596699B2

(12) United States Patent
Kozoshnik et al.

(10) Patent No.: US 12,596,699 B2
(45) Date of Patent: *Apr. 7, 2026

(54) POPULATING MULTI-LAYER TECHNOLOGY PRODUCT CATALOGS

(71) Applicant: Wiz, Inc., New York, NY (US)

(72) Inventors: Gal Kozoshnik, Petah Tikva (IL); Raaz Herzberg, Tel Aviv (IL); Yinon Costica, Tel Aviv (IL); Yaniv Shaked, Tel Aviv (IL); Daniel Klein, Tel Aviv (IL); Ami Luttwak, Binyamina (IL)

(73) Assignee: Wiz, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/887,768

(22) Filed: Sep. 17, 2024

(65) Prior Publication Data

US 2025/0013625 A1 Jan. 9, 2025

Related U.S. Application Data

(63) Continuation of application No. 18/672,758, filed on May 23, 2024, which is a continuation of application
(Continued)

(51) Int. Cl.
*G06F 16/23* (2019.01)
*G06Q 10/087* (2023.01)

(52) U.S. Cl.
CPC ........... *G06F 16/23* (2019.01); *G06Q 10/087* (2013.01)

(58) Field of Classification Search
None
See application file for complete search history.

(56) References Cited

U.S. PATENT DOCUMENTS 6,463,530 B1 10/2002 Sposato
8,447,728 B2 * 5/2013 Prahlad .................. G06F 21/604
707/627
(Continued)

OTHER PUBLICATIONS

Wikipedia contributors. (May 29, 2025). Static program analysis. Wikipedia, The Free Encyclopedia. http://en.wikipedia.org/w/index.php?title=Static_program_analysis&oldid=1292971924.

*Primary Examiner* — Kavita Stanley
*Assistant Examiner* — Cao D Vuong
(74) *Attorney, Agent, or Firm* — M&B IP Analysts, LLC

(57) ABSTRACT

A method and system for populating multi-layer technology product catalogs are provided. The method includes scanning an environment executing a software project to collect hints on technology products required for the execution of the software project; mapping the collected hints to identifiers of technology products to identify technology products required for the execution of the software project; analyzing each of the identified technology products to determine a set of descriptors identifying certain attributes of a technology product; classifying each of the identified technology products to at least one technology layer, wherein a technology layer represents the functionality of a technology product; populating a technology product catalog to including a plurality of entries, wherein each entry is associated with a single technology product and marinates the set of descriptors and the least one technology layer associated with the technology product; and saving the populated technology product catalog in a database.

23 Claims, 7 Drawing Sheets

Related U.S. Application Data

No. 17/190,148, filed on Mar. 2, 2021, now Pat. No. 12,026,144.

(56)            References Cited

U.S. PATENT DOCUMENTS

| | | | |
|---|---|---|---|
| 9,589,293 B1 * | 3/2017 | Yalamanchi | ....... G06Q 30/0625 |
| 9,824,378 B2 * | 11/2017 | Ogrinz | .............. G06Q 30/0603 |
| 11,425,217 B1 | 8/2022 | Gilat et al. | |
| 11,537,400 B1 * | 12/2022 | Zhang | ....................... G06F 8/53 |
| 11,553,003 B2 * | 1/2023 | O'Neil | .................... H04L 63/20 |
| 2003/0014476 A1 | 1/2003 | Peterson | |
| 2004/0004967 A1 | 1/2004 | Nakatsugawa et al. | |
| 2004/0139206 A1 | 7/2004 | Claudatos et al. | |
| 2007/0112834 A1 | 5/2007 | Farr et al. | |
| 2007/0169168 A1 | 7/2007 | Lim | |
| 2007/0282693 A1 | 12/2007 | Staib et al. | |
| 2010/0138479 A1 | 6/2010 | Zhu | |
| 2010/0280863 A1 * | 11/2010 | Wilcock | .............. G06Q 10/067 |
| | | | 705/348 |
| 2016/0036905 A1 | 2/2016 | Syed et al. | |
| 2017/0006064 A1 | 1/2017 | Agarwal et al. | |
| 2019/0327154 A1 | 10/2019 | Sahoo et al. | |
| 2020/0153703 A1 * | 5/2020 | Peterkin | ................... G06N 7/01 |
| 2021/0182366 A1 | 6/2021 | Fan et al. | |
| 2021/0406152 A1 * | 12/2021 | Quemy | .............. G06F 11/3624 |
| 2022/0012335 A1 * | 1/2022 | Hicks | .................... G06F 21/563 |
| 2022/0035809 A1 | 2/2022 | Kadiyala et al. | |
| 2022/0129561 A1 * | 4/2022 | Shivanna | ............. G06F 16/951 |

* cited by examiner

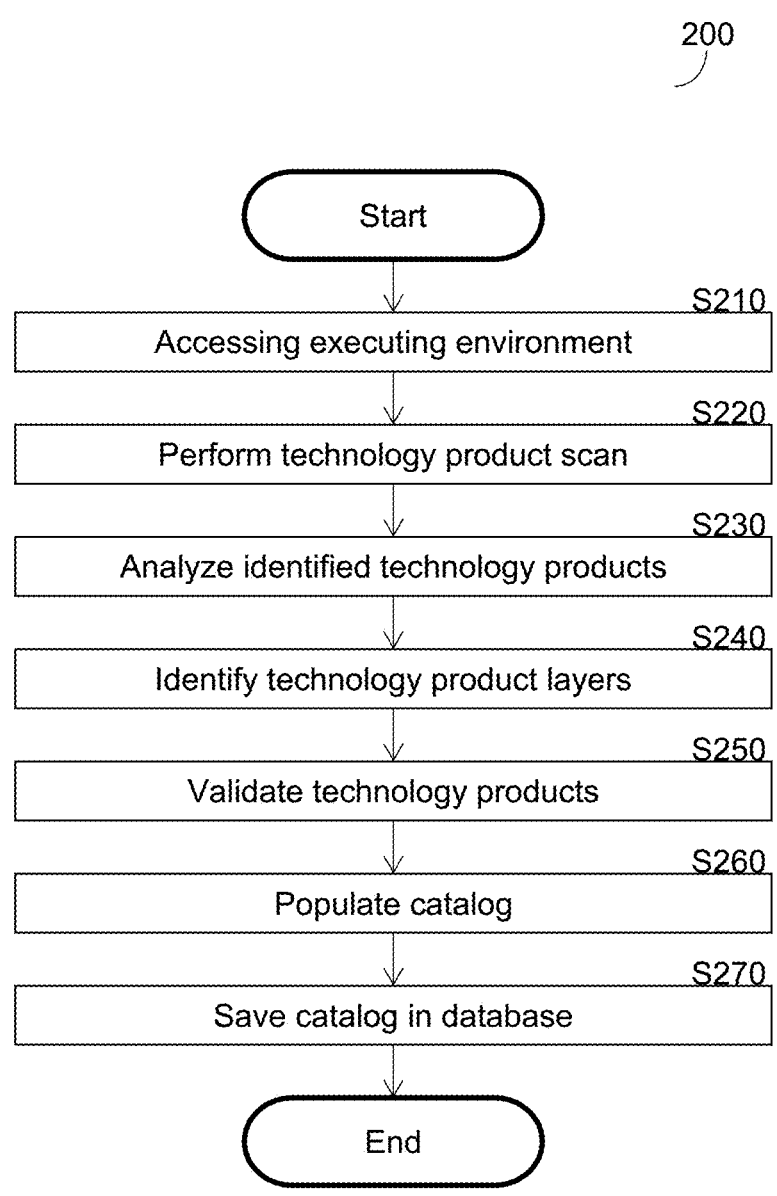

*200*

```
          ┌─────────────┐
          │    Start     │
          └─────────────┘
                 │
                 ▼                    S210
    ┌──────────────────────────────┐
    │ Accessing executing environment │
    └──────────────────────────────┘
                 │
                 ▼                    S220
    ┌──────────────────────────────┐
    │  Perform technology product scan │
    └──────────────────────────────┘
                 │
                 ▼                    S230
    ┌──────────────────────────────┐
    │ Analyze identified technology products │
    └──────────────────────────────┘
                 │
                 ▼                    S240
    ┌──────────────────────────────┐
    │  Identify technology product layers │
    └──────────────────────────────┘
                 │
                 ▼                    S250
    ┌──────────────────────────────┐
    │  Validate technology products │
    └──────────────────────────────┘
                 │
                 ▼                    S260
    ┌──────────────────────────────┐
    │      Populate catalog         │
    └──────────────────────────────┘
                 │
                 ▼                    S270
    ┌──────────────────────────────┐
    │   Save catalog in database    │
    └──────────────────────────────┘
                 │
                 ▼
          ┌─────────────┐
          │     End      │
          └─────────────┘
```

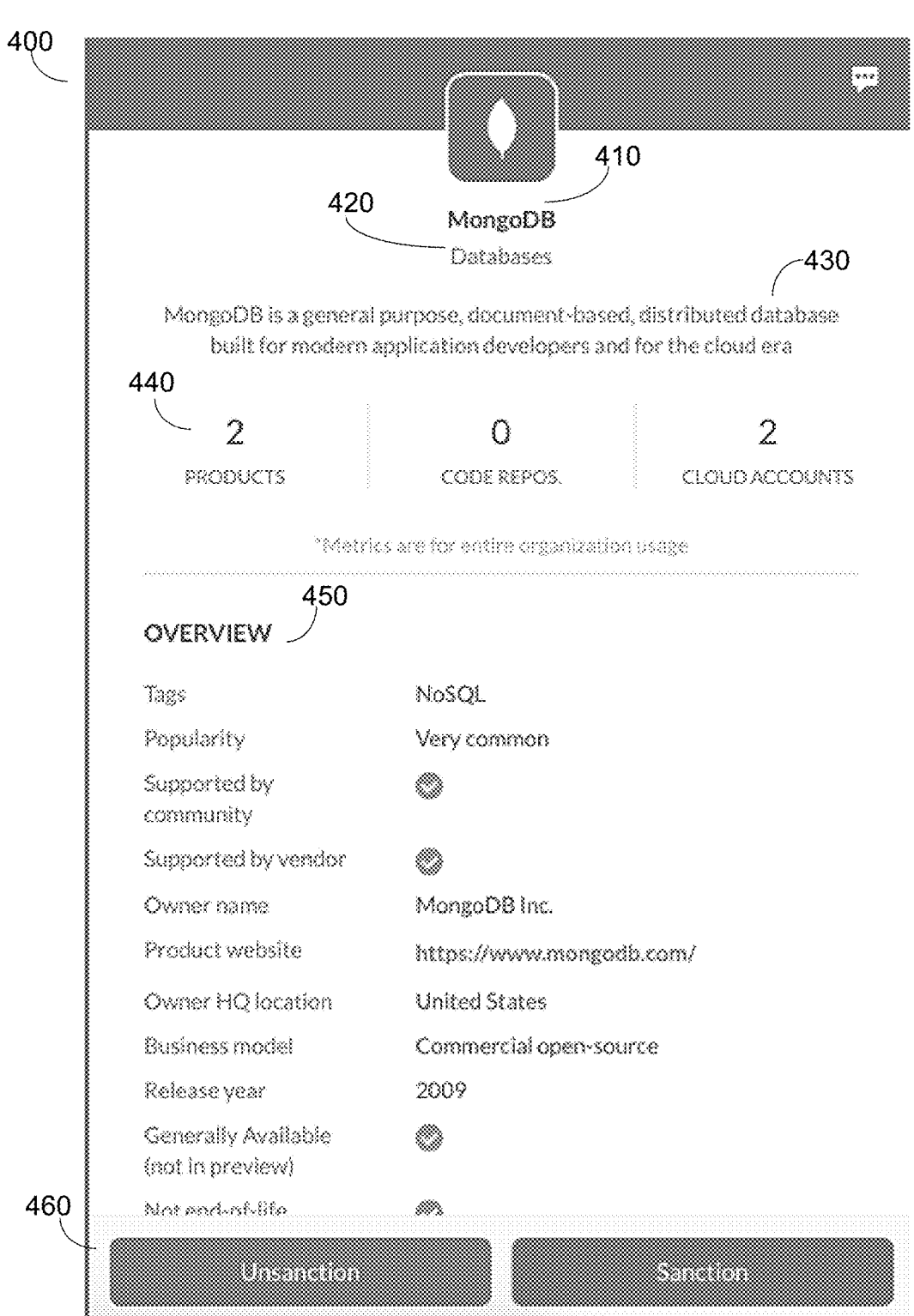

410

420

MongoDB

Databases

430

MongoDB is a general purpose, document-based, distributed database built for modern application developers and for the cloud era

440

| 2 | 0 | 2 |
|---|---|---|
| PRODUCTS | CODE REPOS. | CLOUD ACCOUNTS |

*Metrics are for entire organization usage

450

OVERVIEW

| Tags | NoSQL |
|---|---|
| Popularity | Very common |
| Supported by community |  |
| Supported by vendor |  |
| Owner name | MongoDB Inc. |
| Product website | https://www.mongodb.com/ |
| Owner HQ location | United States |
| Business model | Commercial open-source |
| Release year | 2009 |
| Generally Available (not in preview) |  |
| Not end-of-life |  |

460

Unsanction          Sanction

FIG. 4A

POPULATING MULTI-LAYER TECHNOLOGY PRODUCT CATALOGS

CROSS REFERENCE TO RELATED APPLICATION

This application is a continuation of U.S. patent application Ser. No. 18/672,758, filed May 23, 2024, which is a continuation of U.S. patent application Ser. No. 17/190,148 filed Mar. 2, 2021, now allowed, the contents of which are hereby incorporated by reference.

TECHNICAL FIELD

The present disclosure relates generally to technology product management systems and, in particular, to systems and methods for automatically mapping technology stacks.

BACKGROUND

As businesses, governments, and other organizations expand and increase their digital presence through various computer, network, and web technologies, the same parties may be increasingly vulnerable to developing cyber-threats. While updated solutions provide for management of prior cyber-threats, the same systems may include new vulnerabilities, which attackers may seek to identify and exploit to gain access to sensitive systems and data, Specifically, as organizations increasingly employ third-party software solutions, in various configurations, the vulnerabilities inherent to the employed solutions may create additional vulnerabilities for the organization.

While application developers, service providers, and other, like, creators of third-party software systems may attempt to maintain safe, secure products by remaining aware of product vulnerabilities and creating software patches, developers and the like may be unable to provide absolute security for all products. As a result, organizations which employ such third-party products, such as for inventory management, payment processing, and the like, may be, by virtue of applying the products, vulnerable to cyber-threats. In order to maintain awareness of threats relevant to an organization's technology infrastructure, system admins, and the like, may consider the organization's various projects, and the technologies or "products" used in such projects, in order to generate technology stacks. A technology stack refers to the entire suite of technologies and products used by an organization, as well as various subsets thereof. While operators and administrators may wish to maintain to-the-minute awareness of the various products and technologies included in the organization's stack, the number of such technologies may limit the ability to maintain such awareness.

Due to the volume of technologies and products which an organization may employ to advance its operations, there is a real need to catalog and monitor all technologies and products utilized by an organization in its software development projects. While operators and administrators may consider manually updating the organization's stack each time a product or technology is added to, or removed from, the organization's model, such manual review may be made difficult by the number of technologies or products employed. Further, as various departments may use different technologies or products for different projects, manual generation of an organization's technology stack may be limited by the communication between departments and stack administrators. In addition, manual compilation of an organization's stack may fail to provide for automatic identification of product vulnerabilities, reducing the likelihood that a system operator or administrator may be able to consistently mitigate vulnerabilities of the products in the stack, thereby increasing the organization's susceptibility to cyber-threats. Thus, manual cataloging of software applications fails to predict.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the terms "some embodiments" or "certain embodiments" may be used herein to refer to a single embodiment or multiple embodiments of the disclosure.

Certain embodiments disclosed herein include a method for populating multi-layer technology product catalogs. The method comprises scanning an environment executing a software project to collect hints on technology products required for the execution of the software project; mapping the collected hints to identifiers of technology products to identify technology products required for the execution of the software project; analyzing each of the identified technology products to determine a set of descriptors identifying certain attributes of a technology product; classifying each of the identified technology products to at least one technology layer, wherein a technology layer represents the functionality of a technology product; populating a technology product catalog to include a plurality of entries, wherein each entry is associated with a single technology product and marinates the set of descriptors and at least one technology layer associated with the technology product; and saving the populated technology product catalog in a database.

In addition, certain embodiments disclosed herein include a system comprises: a processing circuitry; and a memory, the memory containing instructions that, when executed by the processing circuitry, configure the system to: scan an environment executing a software project to collect hints on technology products required for the execution of the software project; map the collected hints to identifiers of technology products to identify technology products required for the execution of the software project; analyze each of the identified technology products to determine a set of descriptors identifying certain attributes of a technology product; classify each of the identified technology products to at least one technology layer, wherein a technology layer represents the functionality of a technology product; populate a technology product catalog to include a plurality of entries, wherein each entry is associated with a single technology product and marinates the set of descriptors and at least one technology layer associated with the technology product; and save the populated technology product catalog in a database.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 2 is a flowchart depicting a method for populating a multi-layer technology product catalog, according to an embodiment.

FIG. 4A is an illustration depicting a technology product catalog overview platform information pane, according to an embodiment.

DETAILED DESCRIPTION

Figure 1A:
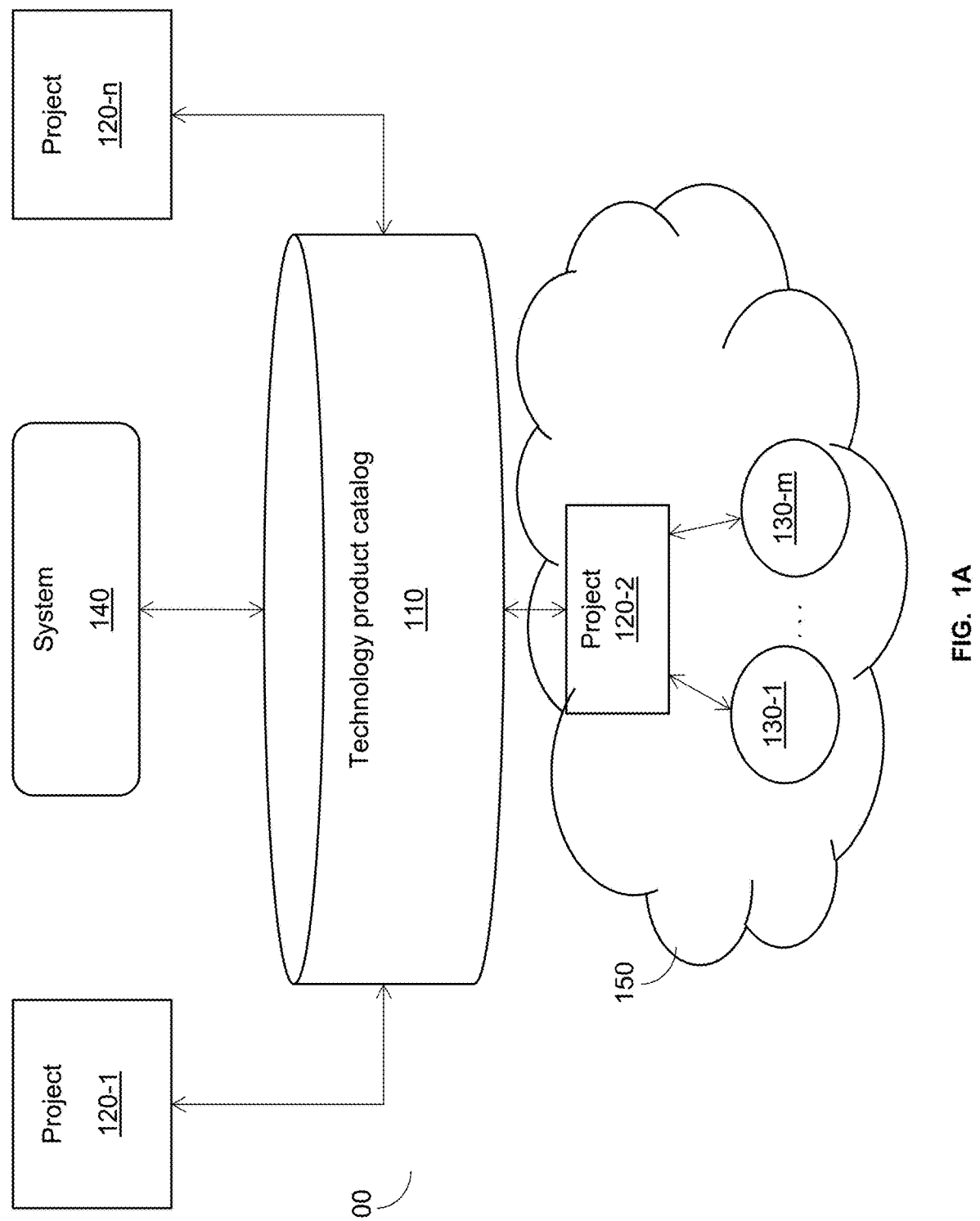
FIG. 1A is a flow diagram depicting a set of relationships between an organization's projects, technology products, and technology product catalog, according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1A is an example diagram 100 depicting a set of relationships between an organization's projects 120, technology products 130, and technology product catalog 110, according to an embodiment. The diagram 100 includes a technology product catalog 110, multiple software projects, 120-1 through 120-n (hereinafter, "projects" 120 or "project" 120), multiple technology products, 130-1 through 130-m (hereinafter, "technologies" 130 or "technology" 130), and a system 140 configured to perform the disclosed embodiments.

The software projects 120 are executed using a set of technologies 130 that are residing in an executing environment 150. The environment 150 may include a collection of a cloud infrastructure (e.g., PaaS), workloads, and code (that may be stored in code repositories). A workload (or cloud workload) is a specific application, service, capability or a specific amount of work that can be run on a cloud resource. Examples for cloud resources include virtual machines, databases, containers, Hadoop nodes, and the like.

As applicable to the projects 120, "n" is an integer having a value greater than or equal to 1. Further, as applicable to the technologies 130, "m" is an integer having a value greater than or equal to 1. It may be understood that, while the diagram 100 provided with respect to FIG. 1A includes various numbers and configurations of each included element, other, like, numbers, configurations, or both, of the included elements, may be applicable without loss of generality or departure from the scope of the disclosure.

The technology product catalog 110 (hereinafter, "catalog" 110) is a set of technology products (or simply technologies) 130 in use within the organization to execute or otherwise access multiple software projects 120. The catalog 110 may be realized as a list, table, or other, like, data feature providing for recording and organization of the various technologies 130 contained therein. The catalog 110 may be stored to one or more memory components, such as servers, databases, repositories, and the like, as well as any combination thereof. All such components may be included in a cloud computing platform. Further, the catalog 110 may be presented to users for access and interaction in one or more formats and via one or more means including, without limitation, the catalog overview platform described with respect to FIGS. 3-4B, below. The information in the catalog 110 may be searchable, queried, or both. In an embodiment, multiple catalogs 110 may be relevant to a given organization and may be variously interconnected and interrelated. In an additional embodiment, an no catalogs 110 may be relevant to an organization, and various project catalogs, similar to the catalog 110, may be applicable.

The catalog 110 provides a detailed view of the various technology products 130 utilized to execute the software projects 120. Technology products' 130 details may be organized within the catalog 110 based on factors including, as examples and without limitation, technology 130 code layer, relevant projects 120, technology 130 execution platform, technology 130 types, technology 130 tags, keywords, and the like, other, like, factors, and any combination thereof. Further, the catalog 110 may provide technology 130 details and descriptions including, as examples and without limitation, technology 130 name, technology 130 type, technology 130 use layer, technology 130 deployment within the organization, technology 130 status, various organization-independent details, such as technology 130 publisher and version number, other, like, details and descriptions, and any combination thereof.

In addition to those details and factors described herein, the catalog 110 may include descriptors relevant to the various included technologies 130, where such identifiers may include, without limitation, technology product 130 package identifiers, technology product 130 package or resource paths or addresses, technology product 130 binaries, and the like, as well as any combination thereof. The inclusion of such identifiers may provide for the application of one or more technology product identification or detection processes, including, as examples and without limitation, detection of technology products based on included identifiers, detection of technology products based on various identifier hashes, other, like, methods, and any combination thereof.

The projects 120 are various aspects of an organization, configured to provide for various functionalities. As an example, an online retail store may be supported by the operations of inventory, shipping, payment processing, and website management departments and systems, each of which may be represented as a project 120. The various projects 120 may further include various technology products 130, as described hereinbelow, wherein the various technologies 130 included in each project 120 may be included in the catalog 110. In an embodiment, where no central catalog 110 is configured, and where project-level catalogs are instead configured similarly to organization catalogs 110, each project-level catalog may include the various technologies 130 relevant to that project 120. It may be understood that, while technologies 130 are only shown with respect to project 120-2, other, like, projects 120 may be likewise related to various technologies 130 without loss of generality or departure from the scope of the disclosure.

A technology product 130 is any resource that enable execution or provide various functionalities of a software project 120, or portion thereof, to which the technology 130 relates. A technology 130 may be realized in software, hardware, firmware, or combination thereof. The technologies 130 may include services, components, devices, systems, software applications, databases, software containers, micro-services, files, software packages, software libraries, cloud computing platforms, elements of cloud platforms, and the like, as well as any combination thereof.

As an example, a shipping system of an online retailer, which may be represented as a project 120, may include services for generating shipping labels, actuating shipping machines, updating shipping databases, and the like, where each such service may be represented as a technology product 130. The technology products 130 may relate to various projects 120 and, in an embodiment, a single technology product 130 may relate to multiple projects. In a further embodiment, technology products 130 may relate directly to the organization catalog 110.

The system 140 is configured to provide for, without limitation, the identification of technology products 130 and relationships, mapping of identified technology products 130 to the technology product catalogs 110, and the like, as well as any combination thereof. In an embodiment, the system 140 may be configured to verify technology product 130 identifications. The system 140 may be configured to execute one or more processes, methods, and the like, including, without limitation, the process described with respect to FIG. 2, below. Further, in an embodiment, the system 140 may be configured to generate or provide one or more outputs relating to various functionalities of the system 140, including, without limitation, various technology product catalog overview platforms or displays, such as those described with respect to FIGS. 3-4B, below. An example system 140 is described in detail with respect to FIG. 5, below.

Figure 1B:
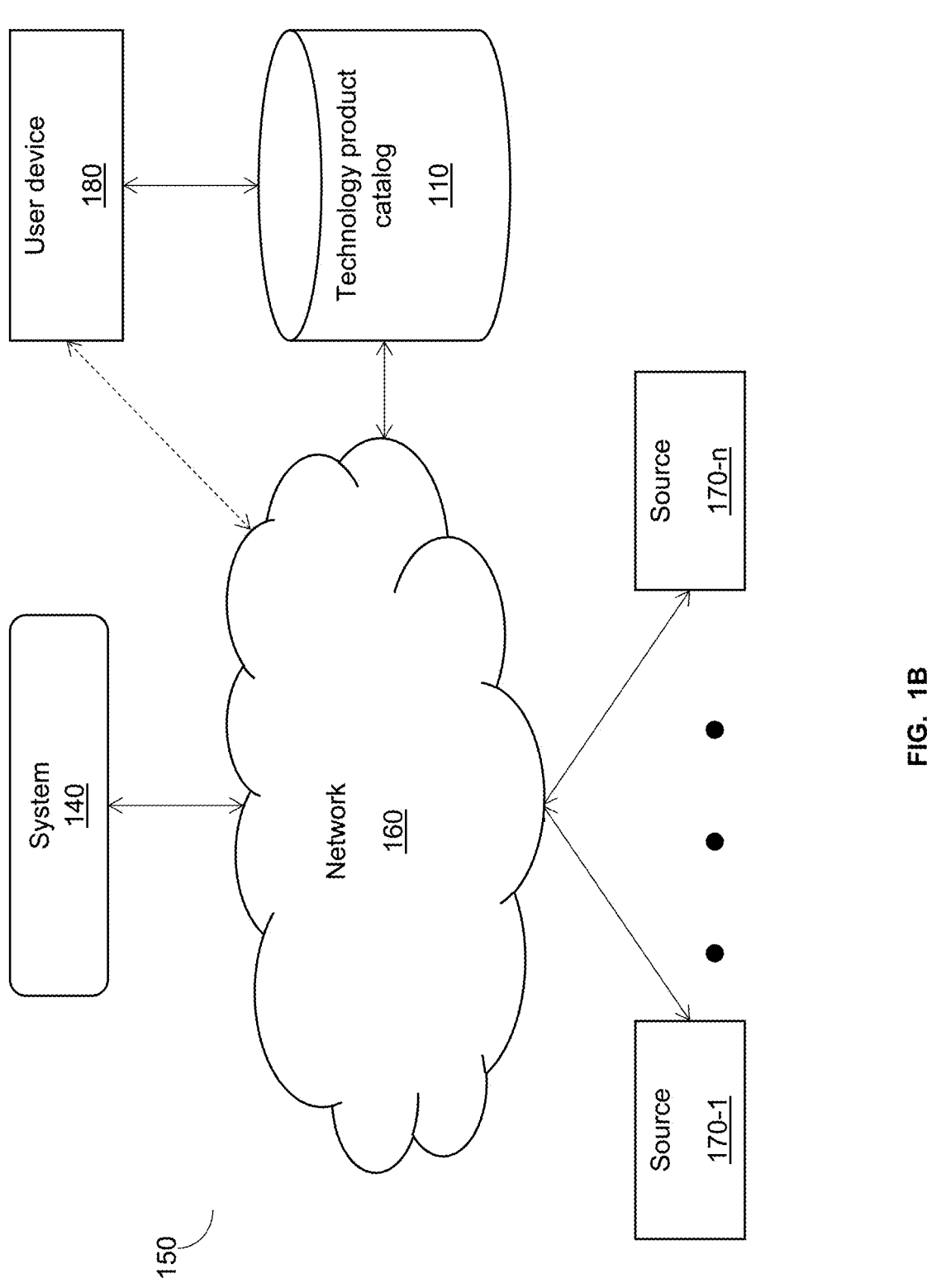
FIG. 1B is a network diagram depicting a network system configured for management of a technology product catalog, according to an embodiment.

FIG. 1B is an example network diagram depicting a network system 150 configured for management of the technology product catalog 110, according to an embodiment. The network system 150 includes the system 140, which may be similar or identical to the system 140 of FIG. 1A, above, a technology product catalog 110, which may be similar or identical to the technology product catalog of FIG. 1A, above, multiple sources, 170-1 through 170-*n* (hereinafter, "sources" 170 or "source" 170), and a user device 180. The various components included in the network system 150 may be interconnected by a network 160, such as is described below. As is applicable to the sources 170, 'r' is an integer having a value of 1 or greater. It may be understood that, while the network system 150 described with respect to FIG. 1B includes the various components described herein, other, like, network systems, including various other components and combinations thereof, may be likewise applicable without loss of generality or departure from the scope of the disclosure.

The network 160 is a communication system providing for the connection of the various components and sub-components of the network system 150 as well as other, like, systems, devices, and components, and any combination thereof. The network 160 may be implemented as a physical network of discrete, systems, devices, and components objects, and the like, as a virtual network, providing for interconnection of various virtual systems and devices, as well as a hybrid physical-virtual network, including both physical and virtualized components. The network may be, as examples, and without limitation, a local area network, a wide area network, the Internet, the World-Wide Web (WWW), and the like, as well as any combination thereof.

The sources 170 are various technology host systems and devices, with or on which the various technologies described herein may be stored, executed, or otherwise applied. Sources 170 may include, as examples and without limitation, technology deployment environments, code development and deployment tools, such as continuous improvement and continuous deployment (CI/CD) tools, third-party sources, such as external vulnerability databases, code repositories, platform-as-a-service (PaaS), and other, like, self-deploying technologies, containerized applications and technologies, such as database instances deployed within a container, and the like, as well as any combination thereof.

Other, relevant sources include, without limitation, dictionaries, codebases, and other, like, sources of code dependency information, cloud service provider catalogs, such as may be maintained for cloud services, such as Microsoft Azure®, Amazon AWS®, and the like, Software as a Service (SaaS) and application programming interface (API) inventories, vulnerability information repositories, and the like, such as national institute of standards and technologies (NIST) vulnerability databases, GitHub vulnerability databases, and the like, software release packages, such as packages variously tagged within a Linux distribution with information describing whether the packages are "default" packages, source code repositories, such as Github and Gitlab, relevant webpages for each technology, such as homepages, security guides, and the like, machine images and default layouts, such as may be collected from scans of Amazon AWS® marketplace, DockerHub, and Linux® distributions, other, like, sources, and any combination thereof. Such sources 170 may be scanned to collect various relevant data features, such as via a scanning process similar or identical to that described with respect to S220 of FIG. 2, below.

The technology product catalog 110, which may be similar or identical to that described with respect to FIG. 1A, and which may similarly include the various features and attributes described hereinabove, including, without limitation, descriptions of relevant technologies and the attributes thereof, such as relevant layers, platforms, packages, vulnerabilities, and the like, as well as any combination thereof. The catalog 110 may be configured to generate one or more responses to various catalog queries. Catalog queries may be generated by one or more components of a network system 150 including, without limitation, the system 140, the user device 180, and the like, as well as any combination thereof. A catalog query may include requests for one or more technology product descriptors, or other, like, data features, where such descriptors may include, as examples and without limitation, the code layer or layers on which a specified technology operates or executes, the platform or platforms to which the specified technology is relevant, the packages relevant to the specified technology, the vulnerabilities known to be relevant to the specified technology, and the like, as well as any combination thereof.

The system 140 is configured to generate the catalog 110, query the catalog 110, and manage the catalog 110. Catalog management may include, without limitation, enterprise-level catalog management, system-agnostic and model-agnostic technology visualization and insight generation, agentless detection and monitoring of potentially-unwanted technology products, agentless detection and monitoring of sensitive technology products with external exposure, agentless collection of organization stack data via one or more scanning means or methods, other, like, applications, and any combination thereof. In addition, catalog management applications, as may be executed by a system 140, including those methods and processes described herein, may provide for various risk analysis functionalities including, without limitation, per-technology-product analysis of risk levels of various technology products included in a technology product catalog 110, other, like, risk analysis functionalities, and any combination thereof, where such functionalities may provide, for example, for risk analyses executed despite an operator's partial or incomplete knowledge of an technology product catalog 110. Further, it may be understood that some or all of the functionalities and applications described with respect to the system 140 may be likewise applicable to, and executed by, the technology product catalog 110 without loss of generality or departure from the scope of the disclosure.

The system 140 may be further configured to perform selective process executions. Selective process executions may include, without limitation, per-category execution, such as execution for all databases included in an organization's network environment, per-device execution, such as execution for one or more specified computing devices included in an organization's network environment (e.g., by the user device 180), per-technology-product or per-application execution, such as execution for all implementations of a given application or technology product within an organization's environment, as well as other, like, selective executions, and any combination thereof. Further, the system 140 may be configured to periodically detect new technology products when such technology products are added to an organization's technology product catalog, identification of vulnerabilities of such new technology products, and the like, as well as any combination thereof.

The user device 180 is a system, device, component, or the like, configured to provide one or more user interaction functionalities with the technology product catalog 110 via, for example, the system 140. User interaction functionalities may include, as examples and without limitation, collecting data features from the technology product catalog 110, updating data features in the technology product catalog 110, collecting catalog 110 metadata or status data, such as data describing the remaining free storage capacity of the catalog 110, in addition to other, like, functionalities, and any combination thereof.

Examples of systems, devices, and components which may be user devices 180 include, without limitation, smartphones, personal computers, tablet computers, dedicated terminals or kiosks, and the like, as well as any combination thereof. The user device 180 may be configured to connect to the catalog 110, the network 160, and the like, as well as any combination thereof. Further, it may be understood that, while the network system 150 depicted with respect to FIG. 1B includes a single user device 180 for purposes of illustration, various other network systems 150, including alternate numbers of user devices 180, as well as connections thereof, may be likewise applicable without loss of generality or departure from the scope of the disclosure.

FIG. 2 is an example flowchart depicting a method for populating a technology product catalog, according to an embodiment. The method may be performed by the system 140.

The technology product catalog lists technology products included in a cloud environment utilized, and being utilized, for execution of software projects of the organization. A software project may include one or more software applications executed in the executing environment.

At S210, an environment executing a software project in the organization is accessed or otherwise retrieved. As noted above, such executing environment includes cloud infrastructure, workloads, and code. In an embodiment, project code access may include accessing a disk of a machine executing such code, retrieving a snapshot or an image of such code, and the like. In yet another embodiment, the project code may be retrieved from a repository. The project code may be a binary code or high-level programming language code.

At S220, a technology product scan is performed. This may include providing a complete full stack scan of each object in the executing environment. An object may include a cloud infrastructure service, a workload, and code. In an embodiment, a product scan is a static analysis of the code, including any code, configuration files, and the like in the executing environment accessed at S210, to identify technology products utilized to execute, or during the execution of, one or more software applications. It should be noted that technology products utilized means any technology product (or technology, as defined above) deployed, operable, accessed by, or utilized by any resource in the cloud environment for the execution or operation of the software application. The scan is agentless, that is, without an agent being installed in any of the identified technologies and/or the cloud environment. A product scan may include, as examples and without limitation, detection of product ports, services, processes, dependencies, SDKS, file names, file extensions, libraries, and the like, as well as any combination thereof.

For example, the code may include the following code line: db.auth(username, password). This code line allows a user to authenticate to the database, by the product scan reveals that a MongoDB is utilized by the software application to store and/or access data. As another example, the code may include the following code line: git clone https://github.com/scriptexample.git. This code line indicates that a script executed by the application is retrieved from github repository. As yet another example, the code may include the following code line: using Amazon.Lambda.core. The code line is Lambda package for.NET core, which library provides a static Lambda logger, serialization interfaces, and a context object. As yet another example, the scanned code may include the following code lines:

```
environment:
    —SERVICES=s3: 5002
    —DEFAULT_REGION-eu-west-2
    —DATA_DIR=/tmp/localstack/data ports:
    —"5002:5002"
    —"9999:8080"
```

In the example, Amazon® S3 storage is defined, and is used by the application to store or read data.

In an embodiment, the product scan is static program analysis, i.e., analyzing the code without executing code. The product scan would return a list of dependencies stemming from each file, package, and the like designated in the scanned code. The product scan may further include scanning of the configuration files, system files, logs, and the like. In another embodiment, the product scan may include scanning of computing resources (such as virtual machines), and the like.

In another embodiment, a workload is scanned to determine any technology utilized or executed on a cloud workload. For example, detecting an Apache® web server running on VM or a software container. Similarly, the cloud infrastructure is also scanned to detect Platform as a Service (PaaS) executing a type of technology. As example, a cloud infrastructure is scanned to detect a managed database (DB)

(e.g., managed MySQL), detect a DNS record pointing to a technology (e.g., CNAME pointing to Github), and so on.

The scanning of objects in the executing environment results with hints of each identified technology product. The collected hints are mapped to identifiers of technology products to identify technology products required for the execution of the software project. The identifiers may include a path, binary code, a hash value, a port number to access the product, a code library, a DNS, a URL, and so on.

At S230, each identified technology product is further analyzed to identify the descriptors of the respective type or hints indicating on the technology product. In an embodiment, S230 includes utilizing different scanning or analysis techniques for each type of technology product. For example, a code repository (Github) can be accessed to retrieve more details on the package, library, or file designated on the scanned code. As another example, an identified product can be queried or accessed through an API to gather more details. For example, mongoDB® details can be retrieved using a version query (or command). Such command may return the version number, build details, and git version.

In an embodiment, web sources (e.g., web sites, global repositories) may also access to retrieve complementary descriptors. For example, vendor name, end-of-life status, vendor location, general product description, may be retrieved from web sources. In another embodiment, the configuration files (e.g., App.Config) are accessed based on the detected application.

The product descriptors of a technology product may include, without limitation, any of the following: techID (unique technology product ID); name (technology product official name); categories (specific functional categories to which the technology product belongs); icon (an icon of the technology product); description (a user friendly description of the technology product); tags (any tags to be used to search for this technology product); popularity (how popular is the technology product); supported by community (whether the product is open source and supported by the community); supported by vendor (whether the product is supported and sponsored by a designated vendor); owner name (name of the vendor); technology product website (website of the vendor); owner HQ location (HQ location of the vendor); business model (a business model around the technology product); release year (release year of the technology product); general availably (not in preview); Not end-of-life (whether the technology product is not end of life); implementation language (language in which the technology product is implemented); official repository (location of the repository); license; current releases (current supported releases of the technology product); deployment model (if the technology product is integrated as a code library); is cloud service (whether the technology product is delivered as a cloud service); login URL (a login URL for a cloud service); Cloud Platform; Windows deployment; Windows default log file location; Windows default configuration file location; Linux deployment; Linux default log file location; Linux default configuration file location; Code exploitability; and certifications, in addition to other, like, descriptors, and any combination thereof.

In an embodiment, descriptors identified at S230 may further include security descriptors. To this end, at S230 security data sources are queried. Such sources include, without limitation, reputation databases, CVE databases, or general sources providing a set of security features of the technology product, as well as other, like, sources, and any combination thereof. The security descriptors may include, without limitation, any of: available security checklists; CVE Details link (a link to the CVE details of the technology product); vulnerabilities trend (identified trends over the year); official configuration best practices (a link to an official security best practices tool); security logging (whether the technology product has internal security logging); encrypts data at-rest (technology product offers a way to encrypt the data at-rest); network service provider (the technology product provides access through the network); web access (the technology product support web/HTTP access), and on the like, as well as any combination thereof. The technology product may be tagged or labelled based on one or more of the above descriptors.

In an additional embodiment, descriptors identified at S230 may further include project descriptors, describing the relationship between a technology product and a project in which the technology product is implemented. Project descriptors may be identified by analysis of software project code and dependencies, such as by the processes herein, to identify one or more relationships between projects and technology products. Project descriptors may include, without limitation, counts of the number of times a specific technology product is implemented in a given project, in-project technology product code and resource file locations, significant dates, such as the date on which a technology product was first implemented in a project, the date on which a technology product implemented in a project was most-recently updated, and the like, in addition to other, like, descriptors, and any combination thereof. Further, identification of project descriptors may include labeling or tagging one or more relevant technology products, projects, and the like, with various labels or tags corresponding to the identified descriptors.

At S240, a technology layer of each identified technology product is determined based on the type of product. In an embodiment, the technology layer represents functionality of a technology product. Examples for technology layers include databases, cloud platforms, storage, web servers, mail servers, CI/CD, code, streaming services, and so on. The technology layer is another descriptor relevant to the technology product. In an embodiment, the technology layer of a technology product provides the context of the product. For example, the context of the source product may provide information if the product exposes to an external network, if the product is set with high privileges, whether the product is patched, and so on.

In an optional embodiment, at S250, a technology product is validated. The validation is performed to ensure that an identification of technology product is correct. In an embodiment, S250 includes aggregating all the collected or identified hints, and based on the aggregated hints validating the technology product. For example, to validate whether identification of a database as a mongoDB, access ports of the identified database are checked. If such ports are associated with mongoDB, then the technology product is validated.

At S260, the catalog is populated. The catalog includes a plurality of entries, each entry is associated with a single technology product. Each entry includes all the product descriptors gathered for the technology product. A catalog is generated per organization and is not shared across organizations. An example for such entry is provided in FIG. 4A.

At S270, the populated catalog is saved in a database. Saving of the populated catalog in a database allows querying the stored catalog to retrieve technology products, and their descriptors. Some examples for reports that can be generated based on such queries are described with respect to FIGS. 3-4B.

It should be noted that querying the catalog may be across different technology layers. For example, querying the catalog to retrieve information of MongoDB®, would return results on the code, packages, PaaS, and SaaS hosting an instance of such database.

In another embodiment, notifications may be generated on technology products that are unsupported, potentially malicious, unwanted, and the like. Such technologies are mapped, in the catalog, to applications and products utilizing such technology products.

Figure 3:
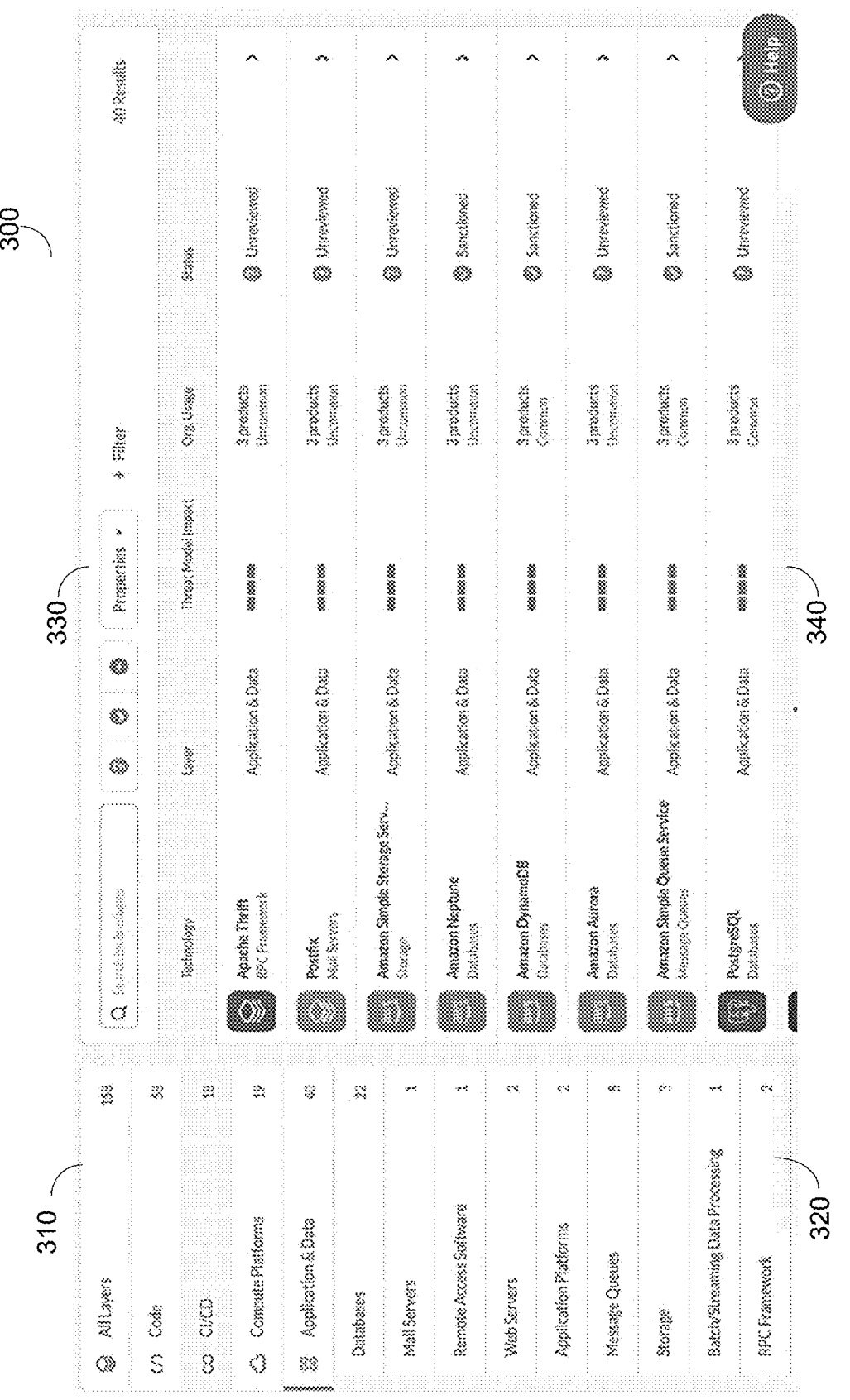
FIG. 3 is an illustration depicting a technology product catalog overview platform, according to an embodiment.

FIG. 3 is an illustration depicting a catalog overview platform 300, according to an embodiment. The catalog overview platform 300 is an interactive platform providing for execution of various functionalities related to an organization catalog, such functionalities including, as examples and without limitation, searching, filtering, organizing, tagging, and otherwise managing the organization catalog, and the various technologies included therein. The catalog overview platform 300 may be provided via one or more modes including, as examples and without limitation, as a web-accessible application or services, accessible through a web browser installed on a user device, as a standalone application, such as may be installed on a user device, via other, like, means, and any combination thereof. The catalog overview platform 300 includes several functional sections including, without limitation, a technology product selection pane 310, a search and filtering toolbar 330, and a technology product overview pane 340.

The technology product selection pane 310 is a functional section of a catalog overview platform 300, providing for classification-based selection of a technology product or group of technology products. The technology product selection pane 310 may include one or more technology product groups, which technology product groups may expand, upon interaction, to display one or more selectable technology product sub-groups 320, where such an interaction may be, for example, a click or a tap. Examples of technology product groups include, without limitation, groups including all technology products, groups including technology products relevant to code development, groups including technology products related to continuous integration and continuous delivery (CI/CD) processes, groups including technology products related to computing platforms, groups including technology products related to applications and data, and the like. Further, examples of relevant sub-groups 320 include sub-groups 320 including technology products related to, without limitation, databases, mail servers, remote access software, web servers, application platforms, message queues, storage, batch and streaming data processing, various frameworks, and the like.

The technology product selection pane 310 may be configured to include, with each selectable group and sub-group 320, a group and sub-group 320 name, as well as a count of the number of technology products included in the given group or sub-group 320. Further, the catalog overview platform 300 may be configured to provide an updated technology product overview pane 340 where a group or sub-group 320 is selected in the technology product selection pane 310, where the updated technology product overview pane 340 may display the various technology products related to the selected group or sub-group 320. The technology product selection pane 310 may be further configured to provide for selection of one or more network objects, computing devices, and the like, where such network objects, computing devices, and the like, may be configured to implement the technologies described herein. The technology product selection pane 310 may be configured to automatically interpret and apply various role-relevant labels or tags to the provided network objects, computing devices, and the like, where such role-relevant labels or tags may describe the functions of such objects, devices, and the like. Role-relevant labels or tags may be generated and applied based on one or more pre-defined or user-defined rules, such as, as an example and without limitation, a rule specifying that "devices which implement technologies categorized under 'web server' are labeled as 'web server devices.'"

The search and filter toolbar 330 is a functional section of a catalog overview platform 300, providing for selective display and filtering of technology product entries included in the technology product overview pane 340. The search and filter toolbar 330 may be configured to include one or more search and filter features including, without limitation, keyword search, technology product property or descriptor selection, compound filtering, including filters based on multiple criteria, and the like. Further, the catalog overview platform 300 may be configured to update the technology product overview pane 340 to display technology product entries matching the one or more criteria specified in the search and filter toolbar 330.

The search and filter toolbar 330 may be configured to provide for selection of one or more technology products or groups of technology products, as may be selected based on one or more user-defined or pre-defined criteria, such as selection of, as examples and without limitation, groups including technology products with internet exposure, groups including technology products with high or elevated privileges, such as technology products which execute with administrator or super-user permissions, groups including out-of-support technology products, and the like, as well as any combination thereof. As an example, the search and filter toolbar 330 may be updated to specify two filtering criteria, specifying selection of technology product entries which are relevant to a "code" technology group and which are implemented five or fewer times throughout the organization's catalog. In response to the specification generated through the search and filter toolbar 330, in the example, the catalog overview platform 300 may be configured to provide an updated technology product overview pane 340, where the updated technology product overview pane 340 includes only those technology product entries matching the specified criteria.

The technology product overview pane 340 is a functional section of a catalog overview platform 300, providing for visual display of, and interaction with, various technology product entries. The technology product entries are data entries relevant to the various technology products included in an organization's catalog, such as the technology products, 130, of FIG. 1A, above. The technology product overview pane 340 may be configured to display one or more technology product entries, as well as various descriptive information for each displayed entry. Examples of applicable types of descriptive information include, without limitation, technology product names, technology product types, technology product groups or sub-groups, technology product ratings according to various evaluative models, such as "threat model impact" ratings, counts of technology implementation throughout the organization's catalog, technology product status, other, like, types of descriptive information, and any combination thereof. Further, the technology product overview pane 340 may be configured to provide for re-ordering of displayed technology product entries, such as in ascending or descending order, based on interaction with one or more technology product description sort selectors, such as may be included in a first row of a table or chart, where such interactions may include, as examples and without limitation, taps or clicks. In addition, the technology product overview pane 340 may be configured to provide for generation of one or more information panes, such as those information panes described with respect to FIGS. 4A and 4B, upon selection of a technology product entry.

FIG. 4A is an illustration depicting a catalog overview platform information pane 400, according to an embodiment. A catalog overview platform information pane 400 (hereinafter, "information pane" 400), is a feature of a catalog overview platform, such as the catalog overview platform, 300, of FIG. 3, above, providing for presentation or display of various details describing a technology product, where such a technology product is included in an organization's catalog. The information pane 400 may include one or more descriptions of a technology product, where such descriptions may include, as examples and without limitation, technology product names and logos 410, technology product categories 420, technology product descriptions 430, organization-level technology product deployment information 440, technology product detail overviews 450, and the like, as well as any combination thereof. Further, an information pane 400 may include one or more action tools 460, where such action tools may be configured to cause a catalog overview platform to execute one or more technology-product-relevant actions, as described hereinbelow.

Technology product names and logos 410, as included in an information pane 400, provide information relevant to the identity of a selected technology product, including, without limitation, a technology product name, a technology product logo, and other, like, information. Further, as may be included in an information pane 400, the technology product category 420 describes the type or category relevant to the selected technology product. Examples of technology product categories 420 include, without limitation, databases, web servers, application platforms, and the like. Further, technology product categories 420 may be categories similar or identical to the various sub-groups, 320, of FIG. 3, above.

In addition, information panes 400 may include technology product descriptions 430, providing brief descriptions of the application and functionality of a selected technology product, organization-level technology product deployment information 440, describing the implementation of the selected technology product throughout the organization's catalog, and technology product detail overviews 450. Technology product detail overviews 450 are data features describing various technology product details, where such details include, as examples and without limitation, various technology product data tags, technology product popularity ratings, technology product support statuses, technology product owner or developer names, technology product websites, technology product owner or developer locations, technology product business model, technology product release date, technology product availability status, and the like, as well as any combination thereof. Technology product detail overviews 450 may further include details describing, as examples and without limitation, whether a given technology product is out-of-support, whether a given technology product is internet-exposed, whether a given technology product applies elevated permissions, such as super-user or administrator access privileges, whether a given technology product includes known vulnerabilities, whether technology product patches, updates, and the like, are available, other, like, details, and any combination thereof. Further, information panes 400 may include technology product detail trend displays, described with respect to FIG. 4B, below.

Action tools 460, as may be included in an information pane 400, are tools configured to cause a catalog overview platform, such as the platform, 300, of FIG. 3, above to execute one or more technology-product-relevant actions. The action tools 460 may be configured to provide for execution of actions relevant to, as examples and without limitation, updating technology product statuses, recategorizing technology products, removing or adding technology product entries, and the like, as well as any combination thereof. Action tools 460 may be variously configured as buttons, text-search tools, sliders, drop-down menus, and the like, as may be applicable to the execution of one or more actions.

In an example embodiment, according to FIG. 4A, action tools 460 may include "sanction" and "unsanction" buttons, providing for the modification of a technology product entry to include a "sanctioned" or "unsanctioned" tag. Such "sanctioned" or "unsanctioned" tags may provide for the designation of one or more technologies as approved for use or restricted from use, where such designations may be made on one or more bases including, without limitation, automatic bases, according to one or more pre-defined or user-defined rules, manual bases, such as by manual designation by an administrator or operator, as well as other, like, bases, and any combination thereof. Further, it may be understood that, while FIG. 4A includes the provided action tools 460 for purposes of illustration, other, like action tools 460, relevant to other, like, actions, may be included in an information pane 400 without loss of generality or departure from the scope of the disclosure.

Figure 4B:
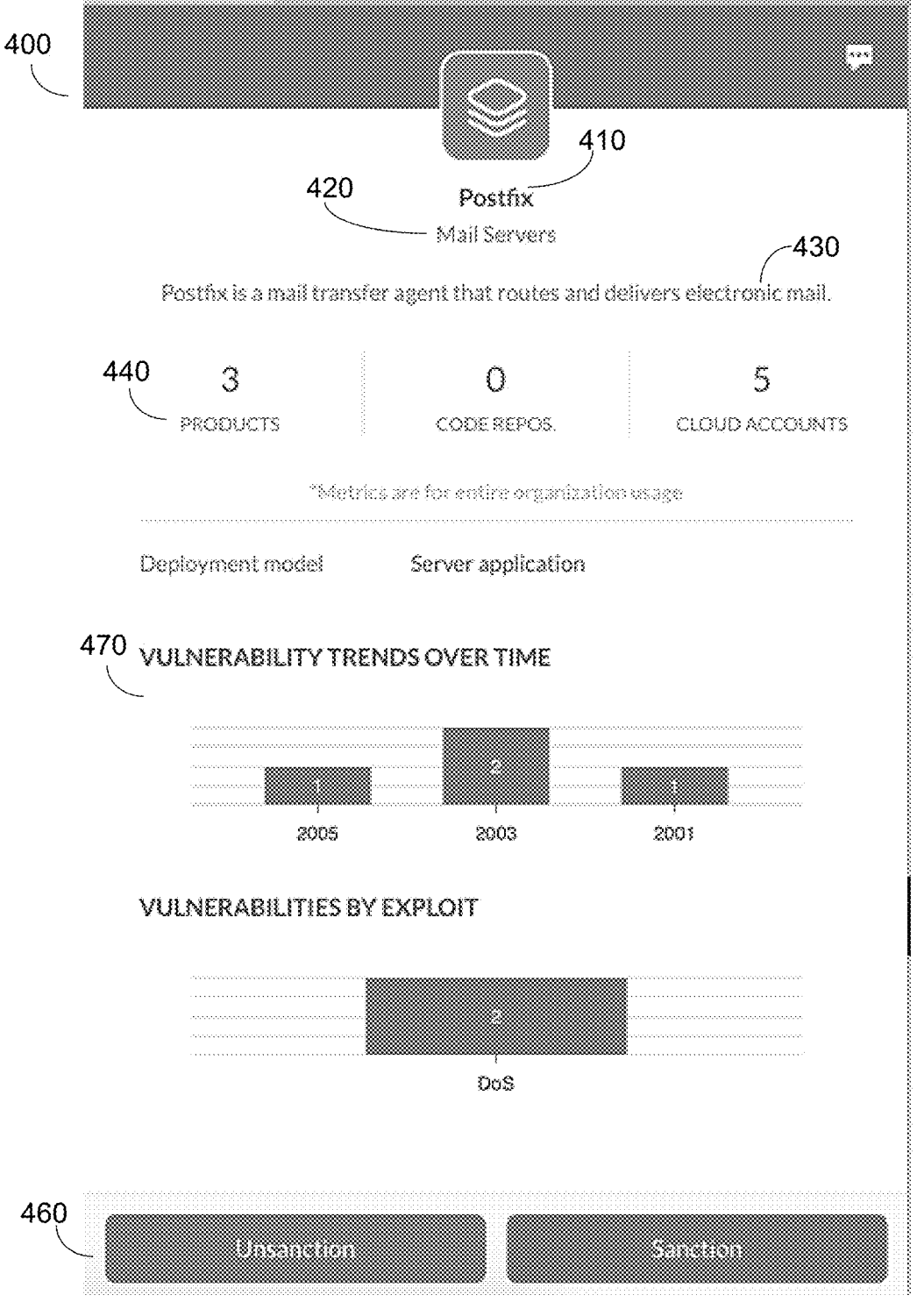
FIG. 4B is an illustration depicting a technology product catalog overview platform information pane, according to an embodiment.

FIG. 4B is an illustration depicting a catalog overview platform information pane 400, according to an embodiment. The information pane 400 described with respect to FIG. 4B is an information pane 400, similar or identical to that described with respect to FIG. 4A, and configured to include multiple technology product detail trend displays 470. Technology product detail trend displays 470 are visual representations of various details or data features relevant to a selected technology product. Technology product detail trend displays 470 may be configured as, as examples and without limitation, charts, graphs, tables, histograms, and the like, as well as any combination thereof. In the example embodiment, technology product detail trend displays 470 are configured to provide visual representations of vulnerability trends over time and vulnerabilities by exploit for a selected technology product. It may be understood that, while the provided technology product detail trend displays 470 are included in FIG. 4B for purposes of illustration, other, like, technology product detail trend displays may be so included without loss of generality or departure from the scope of the disclosure.

Figure 5:
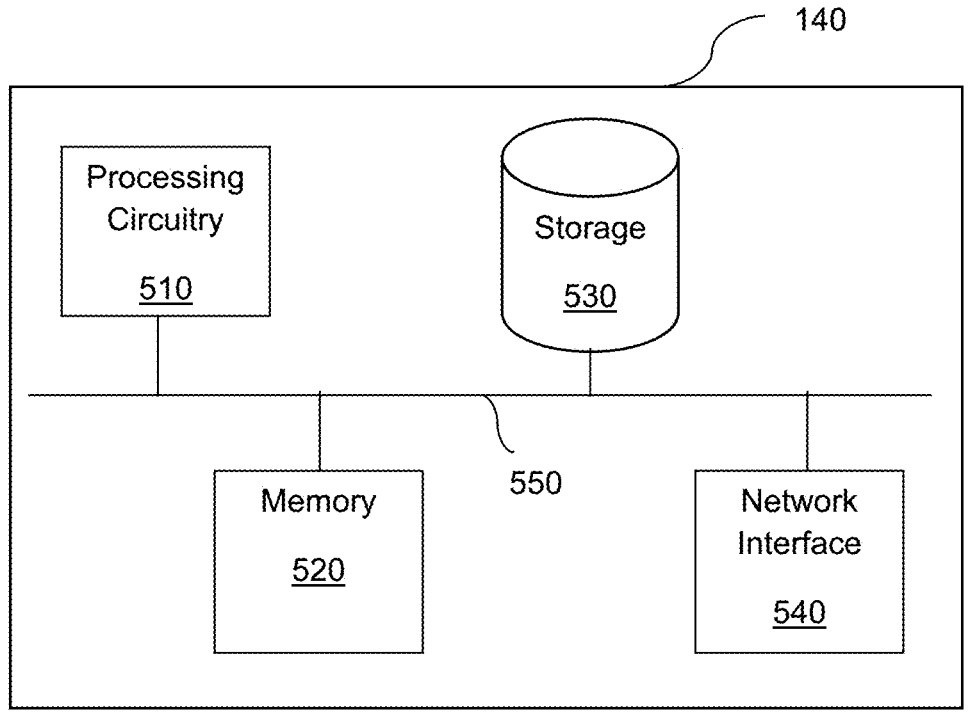
FIG. 5 is a hardware block diagram depicting a code compliance system, according to an embodiment.

FIG. 5 is an example hardware block diagram depicting the system 140, according to an embodiment. The system 140 includes a processing circuitry 510 coupled to a memory 520, a storage 530, and a network interface 540. In an embodiment, the components of the code compliance system 140 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or another memory technology, compact disk-read only memory (CD-ROM), Digital Versatile Disks (DVDs), or any other medium which can be used to store the desired information.

The network interface 540 allows the code compliance system 140 to communicate with the various components, devices, and systems described herein for populating multi-layer technology product catalogs, as well as other, like, purposes.

It should be understood that the embodiments described herein are not limited to the specific architecture illustrated in FIG. 5, and other architectures may be equally used without departing from the scope of the disclosed embodiments.

It should be noted that the computer-readable instructions may be construed broadly to mean any type of instructions, whether referred to as software, firmware, middleware, microcode, hardware description language, or otherwise. Instructions may include code, such as in source code format, binary code format, executable code format, or any other suitable format of code. The instructions, when executed by the circuitry, cause the circuitry to perform the various processes described herein.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units (CPUs), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform, such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for populating a technology product catalog of a cloud computing environment, comprising:
performing static analysis on code of a technology product required for execution of a software project executed in the cloud computing environment;
collecting hints on code of a plurality of technology products;
mapping a collected hint to an identifier of a technology product required for execution of the software project;
analyzing each of the plurality of technology products to determine a set of descriptors identifying at least an attribute of a technology product;
classifying the technology product to at least one software layer of the cloud computing environment;
populating a technology product catalog to including a plurality of entries, wherein each entry is associated with a single technology product and maintains the set of descriptors and the least one software layer associated with the technology product;
storing the populated technology product catalog in a database; and
querying the database based on an identifier of a technology product to detect each software project associated with the technology product.

2. The method of claim 1, further comprising:
generating a visualization based on the populated technology product catalog.

3. The method of claim 1, further comprising:
generating a software inventory based on the populated technology product catalog.

4. The method of claim 1, further comprising:
analyzing the technology product to determine the set of descriptors.

5. The method of claim 1, further comprising:
validating an identity of each of the identified technology products.

6. The method of claim 1, further comprising:
scanning a cloud infrastructure on which the cloud computing environment is deployed for the product code.

7. The method of claim 1, further comprising:
scanning a disk of a machine executing the project code.

8. The method of claim 1, further comprising:
scanning a snapshot of the project code.

9. The method of claim 1, further comprising:
scanning an image of the project code.

10. The method of claim 1, further comprising:
utilizing a different static analysis technique for a different
type of a technology product.

11. The method of claim 1, further comprising:
querying an external security source to determine a security descriptor, wherein the security descriptor includes at least a variability associated with the technology product.

12. A non-transitory computer-readable medium storing a set of instructions for populating a technology product catalog of a cloud computing environment, the set of instructions comprising:
one or more instructions that, when executed by one or more processors of a device, cause the device to:
perform static analysis on code of a technology product required for execution of a software project executed in the cloud computing environment;
collect hints on code of a plurality of technology products;
map a collected hint to an identifier of a technology product required for execution of the software project;
analyze each of the plurality of technology products to determine a set of descriptors identifying at least an attribute of a technology product;
classify the technology product to at least one software layer of the cloud computing environment;
populate a technology product catalog to including a plurality of entries, wherein each entry is associated with a single technology product and maintains the set of descriptors and the least one software layer associated with the technology product
store the populated technology product catalog in a database; and
query the database based on an identifier of a technology product to detect each software project associated with the technology product.

13. A system for populating a technology product catalog of a cloud computing environment comprising:
a processing circuitry;
a memory, the memory containing instructions that, when executed by the processing circuitry, configure the system to:
perform static analysis on code of a technology product required for execution of a software project executed in the cloud computing environment;
collect hints on code of a plurality of technology products;
map a collected hint to an identifier of a technology product required for execution of the software project;
analyze each of the plurality of technology products to determine a set of descriptors identifying at least an attribute of a technology product;
classify the technology product to at least one software layer of the cloud computing environment;
populate a technology product catalog to including a plurality of entries, wherein each entry is associated with a single technology product and maintains the set of descriptors and the least one software layer associated with the technology product
store the populated technology product catalog in a database; and
query the database based on an identifier of a technology product to detect each software project associated with the technology product.

14. The system of claim 13, wherein the memory contains further instructions which when executed by the processing circuitry further configure the system to:
generate a visualization based on the populated technology product catalog.

15. The system of claim 13, wherein the memory contains further instructions which when executed by the processing circuitry further configure the system to:
generate a software inventory based on the populated technology product catalog.

16. The system of claim 13, wherein the memory contains further instructions which when executed by the processing circuitry further configure the system to:
analyze the technology product to determine the set of descriptors.

17. The system of claim 13, wherein the memory contains further instructions which when executed by the processing circuitry further configure the system to:
validate an identity of each of the identified technology products.

18. The system of claim 13, wherein the memory contains further instructions which when executed by the processing circuitry further configure the system to:
scan a cloud infrastructure on which the cloud computing environment is deployed for the product code.

19. The system of claim 13, wherein the memory contains further instructions which when executed by the processing circuitry further configure the system to:
scan a disk of a machine executing the project code.

20. The system of claim 13, wherein the memory contains further instructions which when executed by the processing circuitry further configure the system to:
scan a snapshot of the project code.

21. The system of claim 13, wherein the memory contains further instructions which when executed by the processing circuitry further configure the system to:
scan an image of the project code.

22. The system of claim 13, wherein the memory contains further instructions which when executed by the processing circuitry further configure the system to:
utilize a different static analysis technique for a different type of a technology product.

23. The system of claim 13, wherein the memory contains further instructions which when executed by the processing circuitry further configure the system to:
query an external security source to determine a security descriptor, wherein the security descriptor includes at least a variability associated with the technology product.

* * * * *